Aug. 4, 1953    L. L. BURNS, JR    2,647,949
ADJUSTABLE TUNING FOR MECHANICAL RESONATORS
Filed Oct. 27, 1949
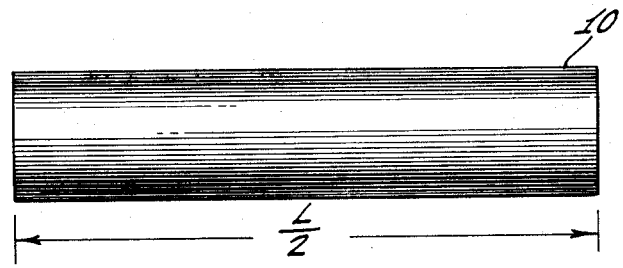
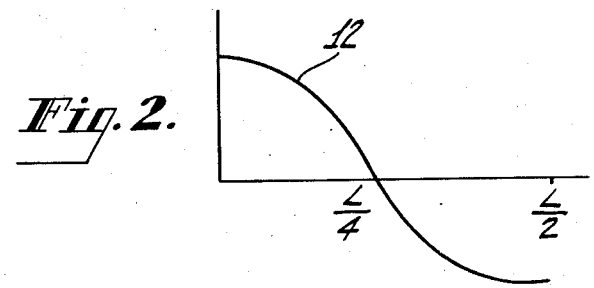
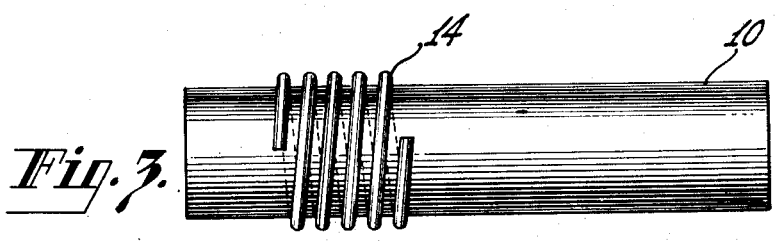
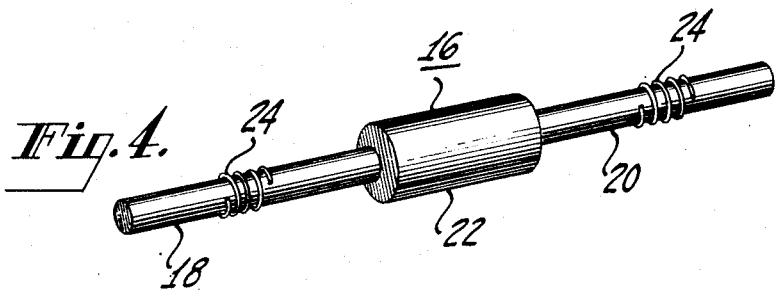
Inventor
LESLIE L. BURNS, JR.
By
Attorney Patented Aug. 4, 1953

2,647,949

UNITED STATES PATENT OFFICE 2,647,949

ADJUSTABLE TUNING FOR MECHANICAL RESONATORS

Leslie Lewis Burns, Jr., Princeton, N. J., assignor to Radio Corporation of America, a corporation of Delaware Application October 27, 1949, Serial No. 123,913

4 Claims. (Cl. 333—71)

This invention relates to resonators, and more particularly to an improved system for tuning mechanical resonators.

Mechanical resonators, such as magnetostrictive vibrators or mechanical filter components, are usually designed to resonate at a certain frequency. After fabrication, however, a test of these vibrators usually indicates that their resonance point is not quite at the desired frequency. It then becomes necessary to change the resonance frequency of the resonator by a means such as adjusting the mass of the vibrator, by some form of loading or shaving, to cause the vibrator to change its resonance frequency to the one desired. These adjustments oftentimes are very difficult ones to make. If the resonator is to be loaded, the loading mass must make an intimate and rigid contact with the resonator in order not to be vibrated loose. Furthermore, the loading should be an adjustable one, since the same mass applied to different portions of the resonator can affect its resonance frequency differently.

One system for loading resonators is to use drops of soft solder, but this is not an adjustable type of loading. A small weight and a set screw are used to obtain a variable loading on a resonator, but this is not very effective because the pressure on the resonator applied by the set screw is a point pressure and is therefore not uniformly distributed. Still another method for obtaining variable loading of a resonator is to use a spring metal clip. This, however, is not a very effective method, since a firm enough contact cannot be maintained by the spring metal clip with the resonator. Methods for loading a resonator that are easily adjustable tend to lower the mechanical Q, or amplitude of response at resonance, of the resonator unless a very firm distributed contact is maintained between the loading and the resonator.

It is therefore an object of my present invention to provide an improved adjustable loading system for mechanical resonators, which system will not be subject to any of the aforementioned disadvantages which are characteristic of prior art methods.

It is a further object of my present invention to provide an improved adjustable loading system for mechanical resonators which does not lower the mechanical Q of the resonator.

It is still a further object of my present invention to provide an improved adjustable loading system for mechanical resonators which is simple and is not loosened with vibration.

These and further objects of my invention are achieved by using a small spring which makes a firm contact with the mechanical resonator. Adjustment of the loading by the spring is made by moving it along the resonator to a portion of the resonator where the mass of the spring on the resonator motion has the desired effect on the frequency of resonance.

The novel features of the invention, as well as the invention itself, both as to its organization and method of operation, will best be understood from the following description, when read in connection with the accompanying drawings in which, Figure 1 is a plan view of a free mechanical vibrator illustrating certain principles of operation considered necessary to an understanding of my present invention, and Figure 2 represents a curve of motion along the length of the vibrator when vibrated at its fundamental frequency at a given instant of time, which curve is considered necessary to an understanding of my present invention, and Figure 3 is a plan view of one embodiment of my invention, and Figure 4 is a perspective view of an embodiment of my invention used with a mechanical filter.

Referring to Figure 1, there is shown a mechanical resonator 10, in the form of a rod having a length of L/2. The fundamental resonant frequency of the resonator 10 is the frequency at which the wavelength is L, or twice the resonator length.

Figure 2 shows a curve 12 which is a plot of the motion of the resonator along its length, at one instant, which occurs when the resonator is vibrated at its fundamental resonant frequency. Motion to the right is assumed to be positive and motion to the left is assumed to be negative. The curve 12 is plotted at the instant of time when both ends of the resonator have begun moving inward toward the center from the normal position. The left end of the resonator moves toward the right and the right end towards the left. The center of the resonator, as may be seen from curve 12, remains motionless. It should be also noted from the curve 12, that the greatest motion occurs at the ends of the resonator and the motion gradually diminishes toward the center. The inward or compressive motion of the resonator continues for a quarter of a cycle at the frequency of resonance and then the motion is reversed and both ends travel outward or expand for one half of a cycle at the resonance frequency. This is followed by a half cycle of compressive motion and then a half cycle of expanding motion. These cycles occur as long as the resonator is vibrated. However, throughout these cycles of motion the outer ends of the vibrator always move the most and the motion diminishes in amplitude toward the center of the resonator.

Figure 3 shows the mechanical resonator 10 having a small helical spring 14 in intimate contact with a portion of the surface of the resonator 10. Besides the mass of the spring 14 being in intimate contact with the resonator and being distributed over a large area of the resonator, the spring material itself has a high mechanical Q and therefore the addition of the spring 14 has an insignificant effect upon the mechanical Q of the resonator. The net effect of the spring is to add a small mass to the resonator to reduce the frequency of resonance. The effectiveness of the spring in reducing the resonant frequency is greatest when it is closest to the outer end, as is to be expected. As the spring is moved toward the center, its effectiveness diminishes with the decreasing motion of the portion of the resonator over which the spring is positioned. When the spring is positioned over the center of the resonator it has substantially no effect on its resonant frequency. By way of example, I have found that a simple half-wave resonator, such as has been described, can be adjusted from 113.2 kc. to 133.2 kc. using a very small spring.

When the resonator is fabricated from one of the commonly used softer metals, such as nickel or aluminum, the spring tends to cut slight threads in the resonator. This permits a smooth adjustment of the frequency of resonance. Another feature of the invention is that in view of the firm contact of the spring with the resonator, the motion of the resonator does not move the spring. Furthermore, the spring resists all attempts to move it by pulling or pushing. However, if one end of the spring is pried up in such a manner as to tend to unwind it, then the spring can be moved to a desired location with very little effort. This action may be explained by the fact that the attempt at unwinding the spring reduces the friction between it and the resonator until the spring moves instead of unwinding further. The spring is, therefore, firmly anchored in place for all forces except an unwinding force.

To extend the range of the frequency tuning effect secured by means of a spring, two springs may be used, one on each side of the center of the resonator vibrating at its fundamental frequency. A spring may be used to tune a resonator which is vibrating in modes other than the longitudinal, for example the torsional mode. The spring may be other than helical in form but, in any event, the spring must be mounted on the resonator so that the effect of the mass of the spring can oppose the motion of the resonator when it is vibrated.

Referring to Figure 4, a section of a mechanical filter 16, is shown which includes two mechanical resonators 18, 20 joined by a coupling element 22. Each resonator 18, 20 has mounted on it a spring 24 for tuning. Thus, in the application of my invention to mechanical filters, a spring may be provided for each resonator which requires tuning. There is therefore provided a simple means for easily tuning a mechanical filter in order that it may have a desired purpose.

The spring may be fabricated from any of the well known spring metals which provide the necessary firm contact to resist being moved by the motion of the resonator when it is vibrated and sufficient mass to effect a change in the frequency of resonance. I prefer a spring made from spring steel, since this provides a very strong, high mechanical Q, but lightweight spring.

From the foregoing description, it will be readily apparent that I have provided an improved system or apparatus for tuning an electro-mechanical resonator, or filter, to a desired frequency of resonance. Although I have shown and described but a single embodiment of my present invention, it should be apparent that many changes may be made in the particular embodiment herein disclosed, and that many other embodiments are all possible, all within the spirit and scope of my invention. Therefore, I desire that the foregoing description shall be taken as illustrative and not as limiting.

What is claimed is:

1. The combination of a mechanical filter comprising a plurality of magneto-strictive resonators joined by coupling elements, and means to tune said filter comprising at least one spring mounted on at least one of said resonators and tightly fitting a portion of its surface to oppose vibratory motion thereof, said spring being mounted thereon to be movable along the surface of said resonator to change its resonant frequency and thereby alter the tuning of the filter.

2. The combination of a magnetostrictive vibrator in the shape of a rod, and a steel helical spring, said spring tightly fitting around a portion of the surface of said vibrator and opposing vibratory motion thereof, said spring being adaptable to be movable along said resonator to provide an adjustable loading therefor.

3. The combination of an electro-mechanical resonator in the form of a rod, and a spring tightly fitting around a portion of the surface of said resonator and opposing vibratory motion thereof, said spring being movable along said resonator to provide an adjustable loading therefor.

4. The combination of a magnetostrictive resonator having a cylindrical surface, a helical spring tightly engaging said surface, said spring being movable along said surface to provide an adjustment of the frequency of oscillation of said resonator.

LESLIE LEWIS BURNS, Jr.

References Cited in the file of this patent

UNITED STATES PATENTS

| Number | Name | Date |
|--------|------|------|
| 1,529,441 | Leinert | Mar. 10, 1925 |
| 1,653,241 | Vana | Dec. 20, 1927 |
| 1,811,403 | Mesinger | June 23, 1931 |
| 1,882,397 | Pierce | Oct. 11, 1932 |
| 2,318,417 | Phelps | May 4, 1943 |
| 2,501,488 | Adler | Mar. 21, 1950 |
| 2,578,452 | Roberts | Dec. 11, 1951 |

FOREIGN PATENTS

| Number | Country | Date |
|--------|---------|------|
| 84,960 | Austria | July 25, 1921 |